United States Patent
Bauer et al.

(10) Patent No.: US 6,561,397 B1
(45) Date of Patent: May 13, 2003

(54) VEHICLE ROOF RACK SYSTEM

(75) Inventors: Robert Bauer, San Diego, CA (US);
Doug Wilson, San Diego, CA (US);
Tom Semple, San Diego, CA (US)

(73) Assignee: Nissan Design America, Inc., San Diego, CA (US)

( * ) Notice: Subject to any disclaimer, the term of this patent is extended or adjusted under 35 U.S.C. 154(b) by 0 days.

(21) Appl. No.: 09/465,917

(22) Filed: Dec. 17, 1999

Related U.S. Application Data (63) Continuation-in-part of application No. 09/350,811, filed on Jul. 9, 1999, now abandoned.

(51) Int. Cl.⁷ ................................................. B60R 9/05
(52) U.S. Cl. ....................... 224/316; 224/321; 224/324; 224/325; 224/326
(58) Field of Search ................................ 224/309, 315, 224/316, 319, 320, 321, 324, 325, 326, 327, 328, 484; D12/412

(56) References Cited

U.S. PATENT DOCUMENTS

| | | |
|---|---|---|
| 1,951,660 A | 3/1934 | Klaudt |
| 2,714,480 A | 8/1955 | Harris |
| D181,747 S | 12/1957 | Pawly et al. |
| D181,748 S | 12/1957 | Pawly et al. |
| D182,705 S | 5/1958 | Binding |
| 2,914,231 A | 11/1959 | Hornke |
| 3,058,636 A * | 10/1962 | Bilbeisi ...................... 224/321 |
| 3,120,323 A | 2/1964 | Sparling |
| D201,013 S | 5/1965 | Duer |
| 3,223,301 A | 12/1965 | Helm |
| 3,554,416 A | 1/1971 | Bott |
| 3,782,295 A | 1/1974 | Balinski |
| 3,856,193 A * | 12/1974 | Bott ............................ 224/316 |
| 3,861,572 A * | 1/1975 | Norris et al. ................ 135/153 |
| 3,880,394 A | 4/1975 | Wisecarver |
| D239,618 S | 4/1976 | Duer et al. |
| D246,238 S | 11/1977 | Boas |
| 4,101,061 A | 7/1978 | Sage et al. |
| D252,961 S | 9/1979 | Carroll et al. |
| 4,179,154 A * | 12/1979 | Ingram ........................ 296/91 |
| 4,241,860 A * | 12/1980 | Ingram ........................ 224/316 |
| 4,277,008 A | 7/1981 | McCleary |
| 4,308,983 A | 1/1982 | Yoshida |
| 4,406,386 A | 9/1983 | Rasor et al. |
| 4,416,406 A | 11/1983 | Popeney |
| 4,501,385 A | 2/1985 | Bott |
| D288,193 S | 2/1987 | Caron |
| 4,650,383 A | 3/1987 | Hoff |
| 4,737,056 A | 4/1988 | Hunt |
| D297,922 S | 10/1988 | Holder |
| 4,824,302 A | 4/1989 | Schultheis et al. |
| 4,834,599 A | 5/1989 | Gordon et al. |
| D314,542 S | 2/1991 | Bott |
| 5,071,050 A | 12/1991 | Pudney et al. |
| 5,082,404 A | 1/1992 | Stewart et al. |
| 5,104,018 A | 4/1992 | Dixon |
| 5,121,958 A | 6/1992 | Goeden et al. |

(List continued on next page.)

Primary Examiner—Stephen K. Cronin
(74) Attorney, Agent, or Firm—Foley & Lardner (57) ABSTRACT

A roof rack system for a motor vehicle, including side-rails, and including a wind deflector, a storage bin, and adjustable cross rails positioned from front to back along the side-rails. The side-rails have a tubular portion that extends along the vehicle, and a plurality of stanchions carrying the tubular portion elevated above the vehicle's roof. The crossbars have clamping members at either end, each having an upper flange and a lower flange that move, relative to each other, to clamp onto the side-rail directly at the end of the crossbar. The storage bin has a basket portion extending between the side-rails, and includes flanges conforming to the upper surface of the side-rails. The basket portion does not extend significantly above the height of the side-rails, and includes a net-like cover, drainage holes and ventilation holes.

39 Claims, 9 Drawing Sheets

U.S. PATENT DOCUMENTS

| | | | |
|---|---|---|---|
| 5,328,310 A | | 7/1994 | Lockney |
| 5,388,744 A | | 2/1995 | Glorio et al. |
| 5,470,003 A | | 11/1995 | Cucheran |
| 5,551,617 A | | 9/1996 | Ray et al. |
| 5,667,116 A | * | 9/1997 | Reinhart et al. ............ 224/315 |
| 5,673,832 A | * | 10/1997 | Whalen ...................... 224/309 |
| 5,713,498 A | | 2/1998 | Cucci |
| 5,758,810 A | | 6/1998 | Stapleton |
| 5,769,292 A | | 6/1998 | Cucheran et al. |
| D406,557 S | | 3/1999 | Bentley |
| D411,506 S | | 6/1999 | Davis |
| D413,562 S | | 9/1999 | Van Dusen et al. |
| 6,056,176 A | * | 5/2000 | Aftanas et al. ............. 224/321 |
| 6,126,051 A | * | 10/2000 | Potter ......................... 224/321 |
| D434,364 S | * | 11/2000 | Bauer et al. ............... D12/412 |

* cited by examiner

VEHICLE ROOF RACK SYSTEM

This is a continuation-in-part application of Ser. No. 09/350,811, field Jul. 9, 1999, now abandoned.

BACKGROUND OF THE INVENTION

This invention relates generally to vehicle roof racks and, more particularly, to motor vehicle roof rack systems having adjustable cross rails.

Roof rack systems are commonly used on some types of motor vehicles, such as sport utility vehicles. Such roof rack systems are typically used to carry a variety of items, such as luggage, boxes, bicycles, and other large sporting gear. Because of the wide variety of items that might be carried by a roof rack, it is preferable for roof racks to be adaptable to the characteristics of each item. Furthermore, because many motor vehicles are capable of traveling at high speed, roof racks must have the structural strength to support the aerodynamic loading placed on the items during such travel.

To provide for structural strength and flexible usage, a number of roof rack systems have been developed that include crossbars that are adjustable in a fore-and-aft direction along a pair of spaced side-rails. Typically, the adjustability comes from a locking mechanism between the crossbar and the side-rail, where the locking mechanism includes hollow portions, gaps, tracks, and/or other complex attachment mechanisms. Such attachment mechanisms provide for increased manufacturing costs, decreased reliability, and increased maintenance costs. These problems can be magnified when the locking mechanisms are used on vehicles that are subject to environments characterized by extreme weather, mud, or other factors that negatively impact complex mechanisms. Such environments are commonly experienced by vehicles such as sport utility vehicles.

Roof rack systems are typically designed with small side-rails and crossbars to minimize aerodynamic drag. Nevertheless, when item s are placed on a roof rack system, aerodynamic drag and aerodynarnic noise can increase substantially. Thus, the aerodynamics can limit the efficiency and tile comfort of the vehicle when carrying such items.

A number of clamping and retaining devices are generally known for connecting crossbars to side-rails. For example, U.S. Pat. No. 5,758,810 discloses a crossbar for use with a motor vehicle roof luggage carrier. The crossbar extends over the top of two side-rails, and includes two gripping jaws, each of gripping jaws hanging down from the side-rail and being configured to grip one of the side-rails. In particular, each gripping jaw includes two semicircular jaw portions that are moved laterally toward each other along a threaded shaft within the crossbar when the shaft is rotated.

U.S. Pat. No. 3,554,416 discloses a roof mounted luggage rack that includes a pair of longitudinally extending, spaced, parallel side-rails which have longitudinally extending slideway portions built into them. Transversely extending cross rails extend between the side-rails, being slidably engaged in the slideway portions of the side-rails.

In U.S. Pat. No. 5,713,498, an aerodynamically shaped cargo container is disclosed to be removably mounted to the crossbars of an automobile roof rack system. U.S. Pat. No. 2,914,231 discloses an open top luggage carrier for an automobile that includes a forward shield disposed at inclined angles to reduce wind. resistance against the carrier and to protect items contained in the carrier against the wind.

Accordingly, there has existed a definite need for a roof rack system offering simplicity of manufacture, use and maintenance, while providing for aerodynamically and structurally efficient support for a wide Variety of items to be carried on the roof of a vehicle. The present invention satisfies these and other needs, and provides further related advantages.

SUMMARY OF THE INVENTION

The present invention provides a roof rack system for a motor vehicle. In various embodiments, it may include side-rails, a wind deflector, a storage bin conforming to the side-rails, and adjustable cross rails. Various embodiments of the invention may provide for simple and efficient manufacture, use and maintenance. Furthermore, various embodiments of the invention may exhibit aerodynamic and structural efficiency, while providing support for a wide variety of items to be carried on a roof.

The roof rack system of the invention commonly includes left and right side-rails, each side-rail having a tubular longitudinal portion that extends in a fore-and-aft direction along the vehicle. The side-rails also include a plurality of stanchions configured to extend upward from the vehicle's roof to carry the longitudinal portion elevated above the vehicle's roof. The longitudinal portion is preferably configured with a consistent cross section along its length, most preferably being circular. One or more crossbars preferably extend between the side-rails.

One feature of the invention is that the crossbars have a preferably oval longitudinal member, and clamping members at either end of the longitudinal member. The clamping members each have an upper flange and a lower flange that form a mouth conforming to at least a portion of the periphery of the side-rails. The upper and lower flanges are vertically movable, relative to each other, so that they can clamp onto the side-rail and hold the crossbar in place.

Additionally, the clamping members are configured to hold the side-rails directly off the ends of the longitudinal member. In other words, the clamping members are configured to receive the-side-rails such that the line of each end of the crossbar intersects its respective side-rail so as to pass through the side-rail, and so as to form a substantially planer upper service at the intersection such that an item could rest on both the crossbar and the side-rail if it is too large to fit within the side-rails.

This feature provides for simply manufactured crossbars and side-rails, without complex mechanisms, and provides flexibility in adapting to the characteristics of various items. In particular, the longitudinal portion of each side-rail and crossbar is preferably a simple tube, and does not require complex manufacture. Furthermore, the side-rails and crossbars lack cavities and complex mechanisms that can be clogged with dirt or grime, or break down through exposure to extreme weather. The preferably oval shape of the longitudinal portion is oriented with its small axis along the airflow, allowing for great strength while minimizing aerodynamic drag and noise. The clamping mechanisms themselves are simple and efficient, and are not very subject to clogging with dirt or grime. This simplicity and efficiency is a hallmark of the present, inventive roof rack system.

Another feature of the invention is a storage bin extending between the left and right side-rails. The storage bin includes flanges configured to conform to the upper surface of the side-rails, and thereby carry the remainder of the storage bin above the vehicle's roof without contacting the roof. This remaining, basket-like portion does not extend significantly above the height of the side-rails. Optionally, the bin may be equipped with a solid cover, or with a net-like cover that has attachment fixtures. Preferably, the attachment fixtures attach to conforming or mating heads of screws, which are also used to hold the storage bin to the side-rails. Furthermore, the storage bin preferably includes a large number of drainage holes and ventilation holes, providing for the storage bin to accommodate wet items such as various types of wet sporting gear after use.

This feature advantageously provides for the storage and carrying of smaller items that might preferably not be placed within the vehicle due to moisture, smell, or other concerns. Its design is aerodynamically efficient, and does not add to the vehicle's height, which can be a concern in taller vehicles such as sport utility vehicles.

Another feature of the invention is an air deflector extending between the front end of the left and right-side-rails. Preferably, the storage bin is located immediately behind the air deflector, thus the air deflector protects items within the storage bin from high speed air flow during vehicle travel, and thus improving the aerodynamic efficiency and noise concerns. Furthermore, the crossbars, and additional storage space between the side-rails, is located behind the storage bin, so as to allow additional items to be adjustably positioned at an optimal location relative to the air deflector and the wash of air occurring behind the air deflector.

Other features and advantages of the invention will, become apparent from the following detailed description of the preferred embodiments, taken in conjunction with the accompanying drawings, which illustrate, by way of example, the principles of the invention.

BRIEF DESCRIPTION OF THE DRAWINGS

1B is a detailed view of a portion of the vehicle roof rack system depicted in FIG. 1A.

DETAILED DESCRIPTION OF THE PREFERRED EMBODIMENTS

Figure 1A:
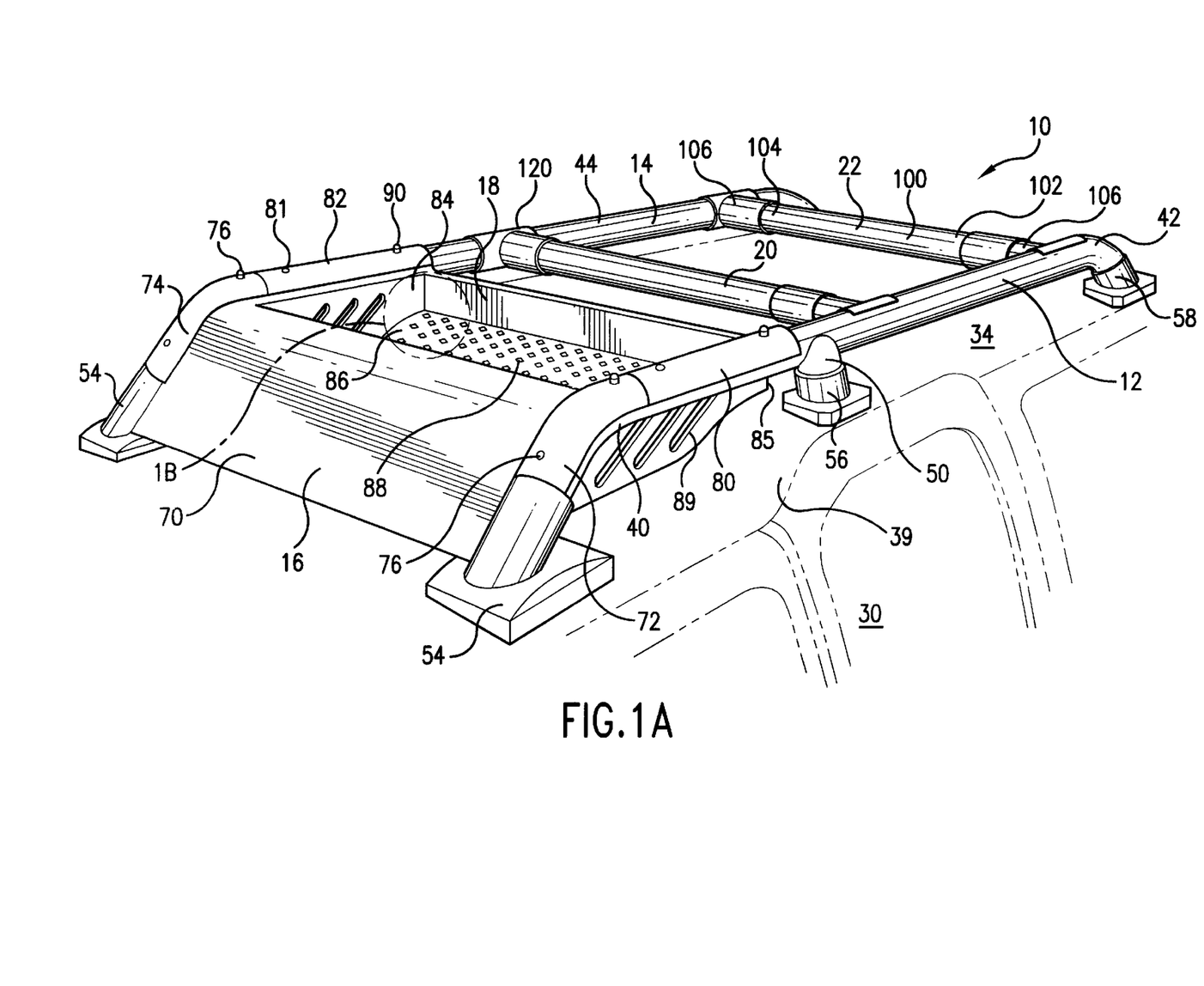
FIG. 1A is a perspective view of a vehicle roof rack system embodying features of the present invention FIG.
Figure 2:
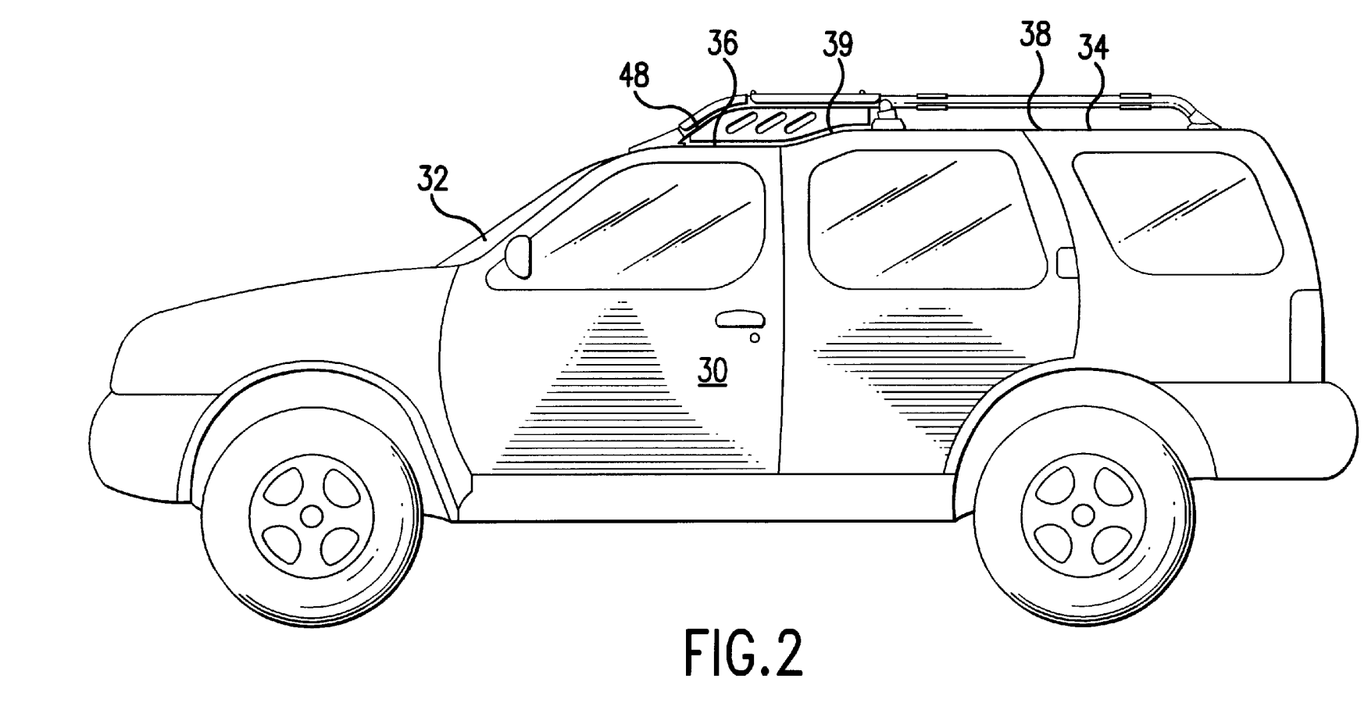
FIG. 2 is a side view of the vehicle roof rack system of FIG. 1, mounted on the roof of a vehicle.

With reference now to the illustrative drawings, and particularly to FIGS. 1A and 2, there is shown a preferred embodiment of a vehicle roof rack system 10 according to the present invention. The system includes a left side-rail 12, a right side-rail 14, an air deflector 16, a storage bin 18, a first crossbar 20 and a second crossbar 22.

In the context of this application, relative directional references such as forward, rearward (aft, backward), fore-and-aft, left, right, lateral, up (above), down (below) or vertical are to be generally understood as referencing a vehicular reference frame, as viewed by a person sitting in a vehicle's driver's seat.

The system is configured for use with a sport utility vehicle 30 having a typical rearward angled windshield 32, and a two-level roof 34 (i.e., with a first roof portion 36 and a second roof portion 38 at different heights). As is seen in FIG. 2, the transition between the first and second roof portions forms a step 39. The air deflector is spaced in front of the step.

The vehicle roof rack system 10 delimits a region of space that serves as a forward cargo basin. In particular, this region of space is substantially delimited by the air deflector 16 and the step in the fore and aft direction, by the left and right side-rail 12, 14 in the lateral direction, and by upper surfaces on the side-rails and the first roof portion 36 in the vertical direction.

It is to be understood that various embodiments of the present invention can be used for a wide range of vehicle types and a wide range of roof configurations, including both split-level roofs and constant level roofs. The vehicle might also be configured with a sunroof (not shown).

Figure 3:
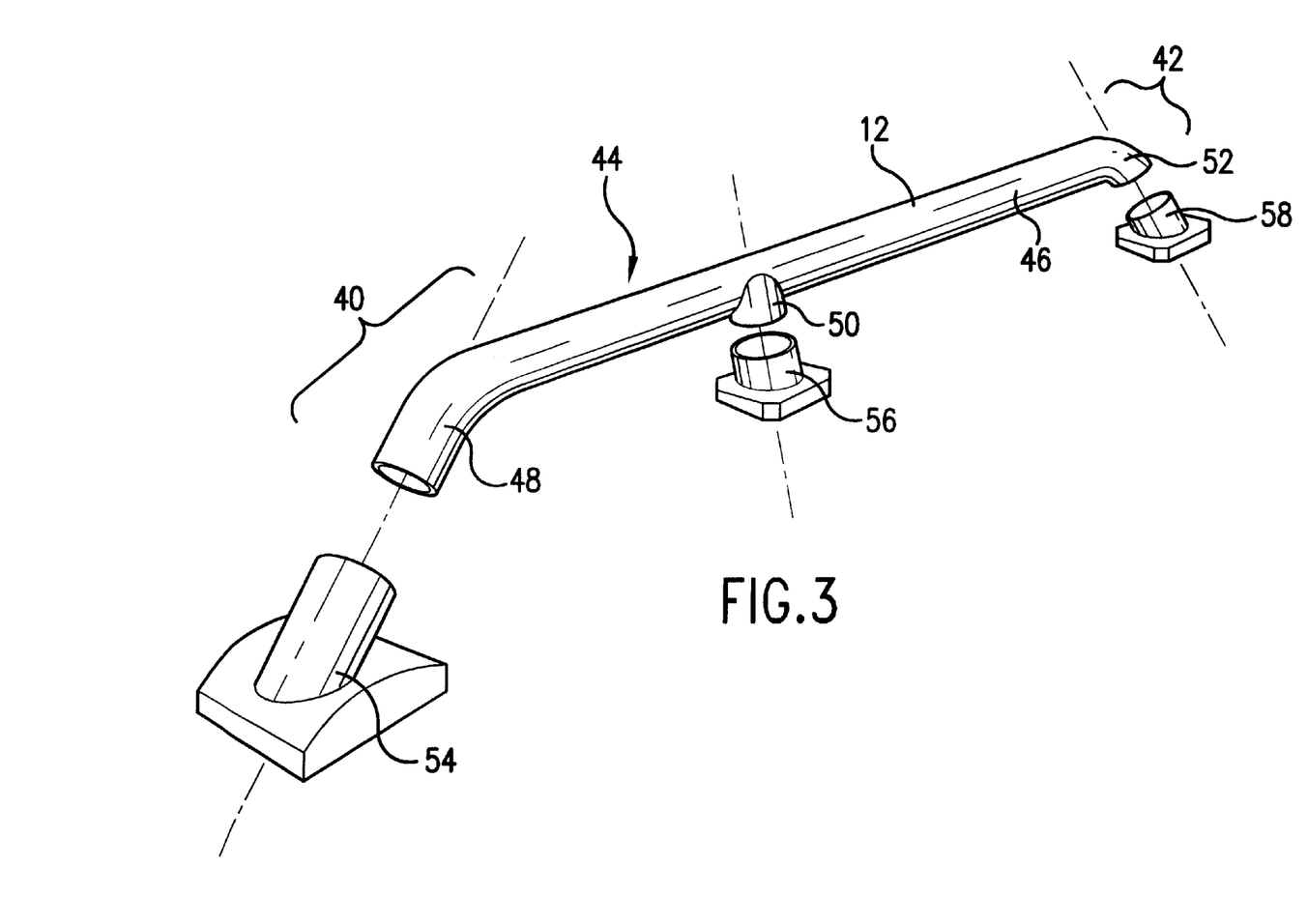
FIG. 3 is an exploded perspective view of a side-rail and three roof mounts from the roof rack system of FIG. 1.

With reference to FIGS. 1A and 3, the side-rails 12 and 14 are constructed in the form of large diameter aluminum tubes, providing for light-weight strength, durability, ease of cleaning and maintenance, and simplicity of manufacture. Each side-rail has a front end 40, a rear end 42 and an upper side 44. Preferably, the side-rail is configured to extend along substantially the full length of the vehicle's roof 34 in a fore-aft direction.

Figure 4:
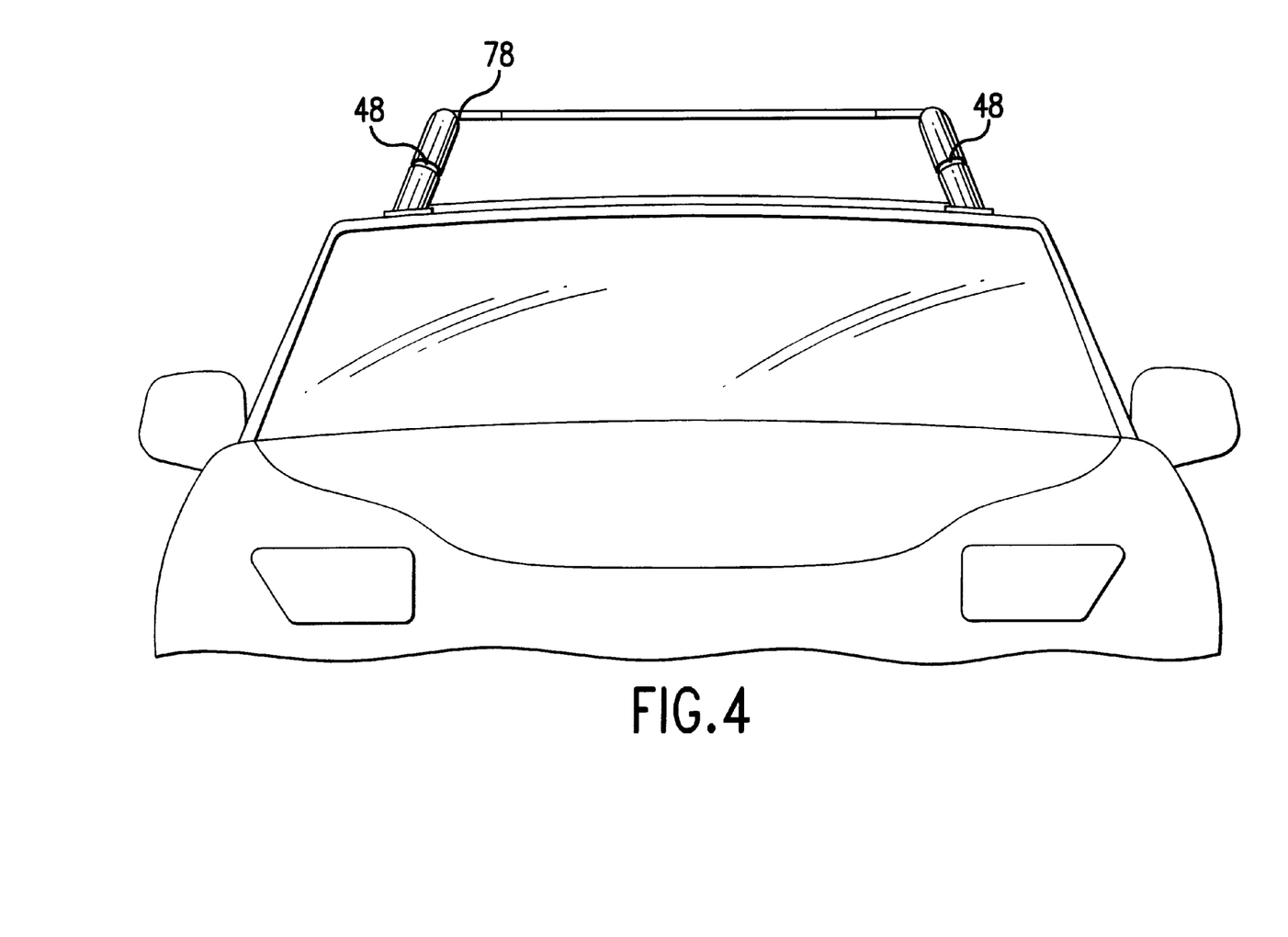
FIG. 4 is a front elevational view of the vehicle and roof rack system of FIG. 2.

Each of the side-rails 12 and 14 includes a longitudinal portion 46 and a plurality of stanchions, including a front stanchion 48, a mid stanchion 50, and a rear stanchion 52. The longitudinal portion 46 of each side-rail is an approximately straight tubular member having a substantially consistent circular cross-section. The stanchions attach to the vehicle's roof, and extend generally upward from the roof to carry the longitudinal portion elevated above the roof 34. In particular, the front stanchion extends in a rearward and upward direction, the rear stanchion extends in a forward and upward direction, and the mid stanchion extends in a primarily upward direction. The front stanchion preferably extends rearward at an angle equal to or slightly greater (i.e., more rearward) than the angle of the vehicle windshield 32 (as depicted in FIG. 2). All three stanchions also extend in an inward direction (i.e., the stanchions of the left and right side-rails extend upward and toward each other, as depicted in FIG. 4), preferably at an angle similar to that of the side of the vehicle.

The front, mid and rear stanchions 48, 50 and 52 are configured to be received in front, mid and rear roof mounts 54, 56 and 58, respectively, to attach to the roof 34. The stanchions can be affixed in the roof mounts by a typical fastening mechanism, such as an adhesive or a fastener. Alternately, the stanchions can be structurally held in the roof mounts by the relative angles of the stanchions. This latter method of attachment offers additional simplicity and efficiency over conventional attachment mechanisms.

With reference again to FIG. 1A, the air deflector 16 preferably is composed of a durable plastic material, and includes a smooth deflection panel 70, a left flange 72 and a right flange 74 that form a simple, unitary component. Preferably, the wind deflector is not unitary with the storage bin, providing for separate removal, and providing for ease of manufacture. The air deflector is most preferably substantially co-planer with the windshield (as is depicted in FIG. 2). The deflection panel extends between the front ends 40 of the left and right side-rails 12 and 14, and is configured to deflect rearward-flowing air upward to pass over the storage bin 18 and other portions of the roof rack system.

The left and right air deflector flanges 72 and 74 conform to the upper side 44 of the left and right side-rails 12 and 14, respectively. In particular, they each form a groove that conforms to and receives the section of the side-rail where the longitudinal; portion 46 and the front stanchion 48 connect. The flange preferably extends down close to the front roof mount 54. Screws 76 are preferably used to attach the air deflector's flanges to the side-rails, with each flange preferably connecting to the longitudinal portion with one screw and to the front stanchion with a second screw. Preferably these screws are durable, and can be easily installed and/or removed to install and/or remove the air deflector.

This section of the side-rail that is received in each flange's groove preferably forms a corner connecting the longitudinal portion to the stanchion, which adds additional strength to the connection between the flange and the side-rail. While the flanges do pass conformingly over the top of the side-rails, preferably they do not extend significantly above the height of the side-rails.

Preferably, the air deflector's deflection panel 70 does not extend above (or at least significantly above) the height of the left and right side-rails, preventing the air deflector from adding to the required clearance height of the vehicle, and placing a limit on the drag of the roof rack system, which can remain unused for substantial driving periods (depending on individual driver needs). More preferably, the deflection panel extends up to a level slightly below the height of the left and right side-rails, and has a smoothly expanding transition 78 to the left and right flanges 72, 74 (see FIG. 4) that provides for added strength and fatigue resistance.

The storage bin 18, which may be composed of durable plastic material, is preferably located immediately behind (rearward of) the air deflector 16, and extends between the left side-rail 12 and the right side-rail 14. A substantial portion of the storage bin is in front of the step 39, and is therefore contained in the forward cargo basin. Similar to the air deflector, the storage bin includes a left flange 80 and a right flange 82, each flange forming a groove that conforms to and receives the longitudinal portion of the side-rail. The storage bin flanges attach to the left and right side-rails, respectively, to carry a basket portion 84 above the vehicle's roof 34 without contacting it. Preferably, the basket portion of the storage bin extends up to a level below the top of the side rails, and more preferably to substantially the'same level as the air deflector's deflection panel 70.

While the side-rails 12 and 14 can be made with fewer than three stanchions, it is preferable the there be at least three stanchions, with one stanchion (the mid stanchion 50) being located substantially at a rearward end 85 of the storage bin 18. With only the air deflector in front of the storage bin, there is also a stanchion (the front stanchion 48) located substantially at the forward end of the storage bin. Thus, with the, storage bin extending between the front end of the side-rails and a mid-portion of the side-rails, the storage basket has a substantially independent support structure, and the addition of heavy luggage on the back part of the roof rack will not likely drive the storage bin into contact with the roof 34 of the vehicle 30.

While the flanges 80 and 82 of the storage bin 18 do pass conformingly over the top of the side-rails 12 and 14, preferably they do not extend significantly above the height of the side-rails. Also, preferably the storage bin flanges are located immediately rearward of the air deflector flanges 72 and 74. Preferably, the basket portion 84 does not extend above (or at least significantly above) the height of the left and right side-rails 12 and 14, preventing the basket portion from adding to the required clearance height of the vehicle 30, and preferably keeping the basket portion within the zone of limited air speed and air turbulence that will exist behind the air deflector 16.

Screws 81 are preferably used to attach the storage bin's flanges 80 and 82 to the side-rails 12 and 14. Preferably these screws are durable, and can be easily installed and/or removed to install and/or remove the storage bin. Preferably, with the storage bin removed, one or more crossbars can be installed in place of the storage bin, with or without the air deflector in place, to provide additional support for luggage.

A bottom portion 86 of the storage bin's basket portion 84 preferably defines drainage holes 88, which are preferably large in number, regularly spaced, and providing visibility through at least 25% of the bottom portion. Such drainage holes can prevent the accumulation of water or mud while driving in inclement whether or off-road. They also allow for the storage bin to conveniently store wet items such as wet suits, garden equipment, or the like. Furthermore, if the vehicle 30 is equipped with a sunroof (or the like) that is at least partially covered by the bottom portion 86, the large and frequent drainage holes can allow for partial visibility through the sunroof.

Figure 1B:
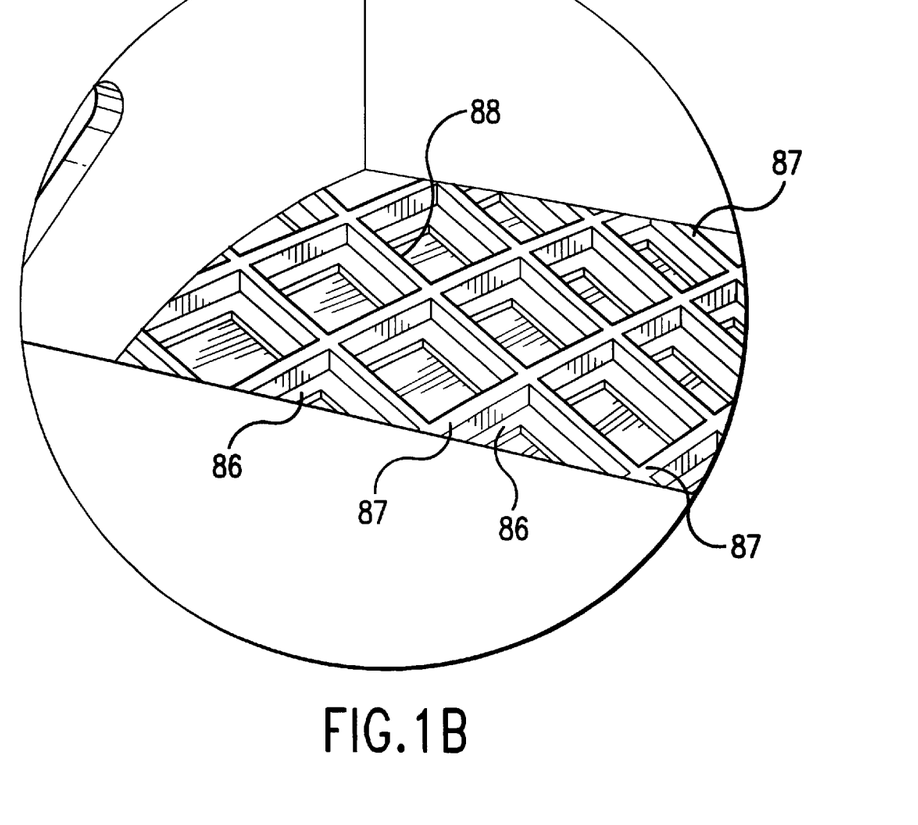

As seen in FIG. 1B, raised ridges 87 are provided around and between the drainage holes 88 to strengthen the storage bin. Preferably, the ridges extend equidistantly above and below the bottom portion, and more preferably they extend above and below by a combined amount that is greater than the distance between the drainage holes. Near to any side of the bottom portion, the ridges can optionally be directed normal to that side, rather than surrounding the holes, to provide additional tensile support. The ridges also provide a limited amount of lateral and fore-and-aft support for items in the storage bin, so as to limit the items sliding around within the bin during motion of the vehicle.

Returning to FIG. 1A, the basket portion 84 of the storage bin 18 also can include cutouts 89 on its sides, which may, in some embodiments, aid in drainage, add ventilation to the storage bin and/or allow the interior of the basket portion to be more visible to a person standing next to the roof rack 10.

To restrain items in the basket portion 84, the storage bin 18, can be equipped with a cover of some type. Preferably, the cover is a net (not shown). The net allows for both ventilation and visibility. The net is preferably equipped with fasteners that can fasten to the roof rack system, and most preferably, fasten to aerodynamically shaped fastener 90 heads that are formed on the screws that are used to hold, the storage bin 18 onto the side-rails 12 and 14.

The preferred embodiment includes at least one, and preferably two or more, crossbars 20 and 22 extending between the left side-rail 12 and the right side-rail 14. Every crossbar includes a preferably straight longitudinal member 100 having a left end 102 and a right end 104, and each of these ends has a clamping member 106 for clamping onto the left and right side-rails longitudinal portions 46, respectively. The clamping members preferably receive the longitudinal member in a hole conforming to the longitudinal member, and preferably are secured to the longitudinal member by one or more screws on the lower side of the clamping member.

Figure 5:
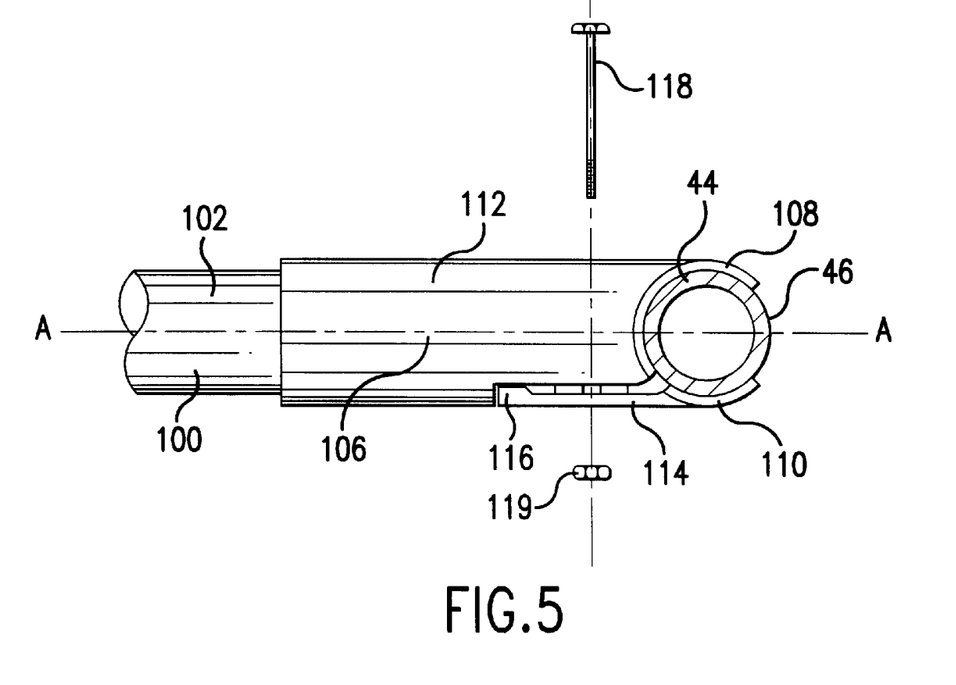
FIG. 5 is a front elevational view of a clamping member of a crossbar from the roof rack system of FIG. 1.
Figure 6A:
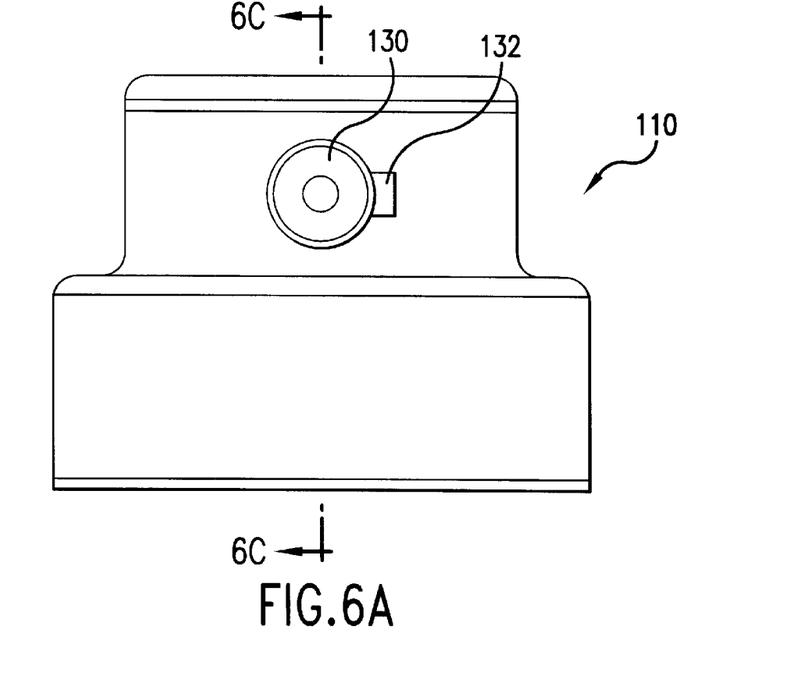
FIG. 6A is a plan view of a bottom flange of a crossbar's clamping member from the roof rack system of FIG. 1.
Figure 6B:
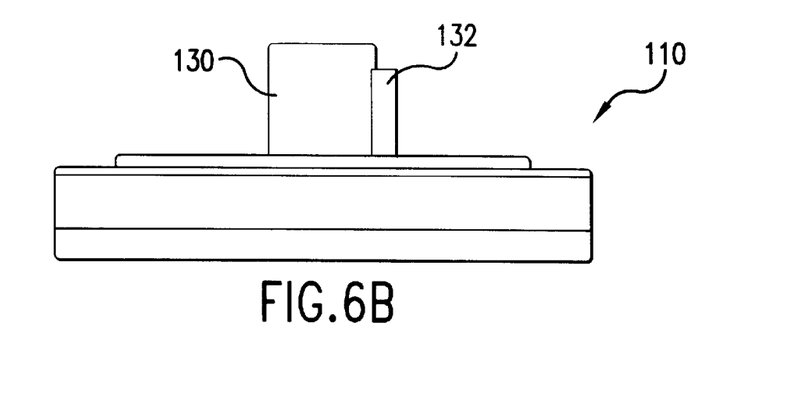
FIG. 6B is a front elevational view of the bottom flange of FIG. 6A.
Figure 6C:
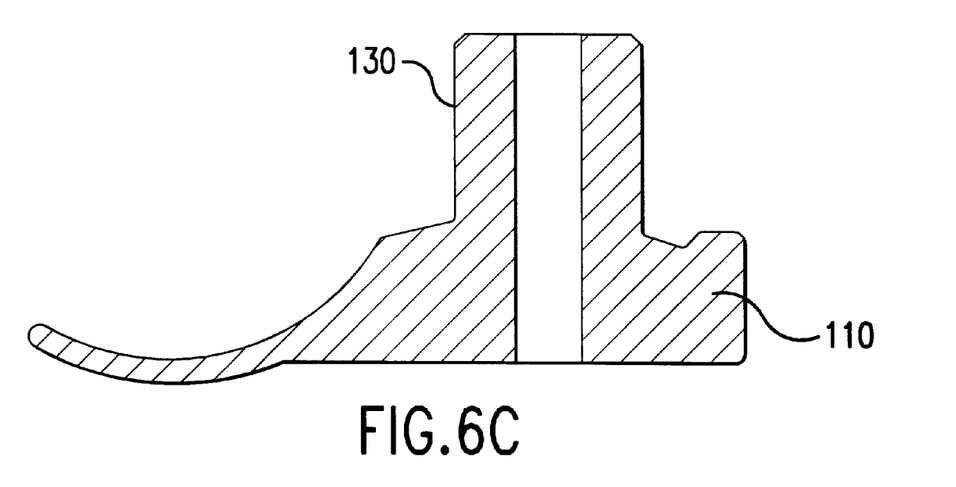
FIG. 6C is a cross-sectional view of the bottom flange of FIG. 6A, taken along line 6C—6C of FIG. 6A.
Figure 6D:
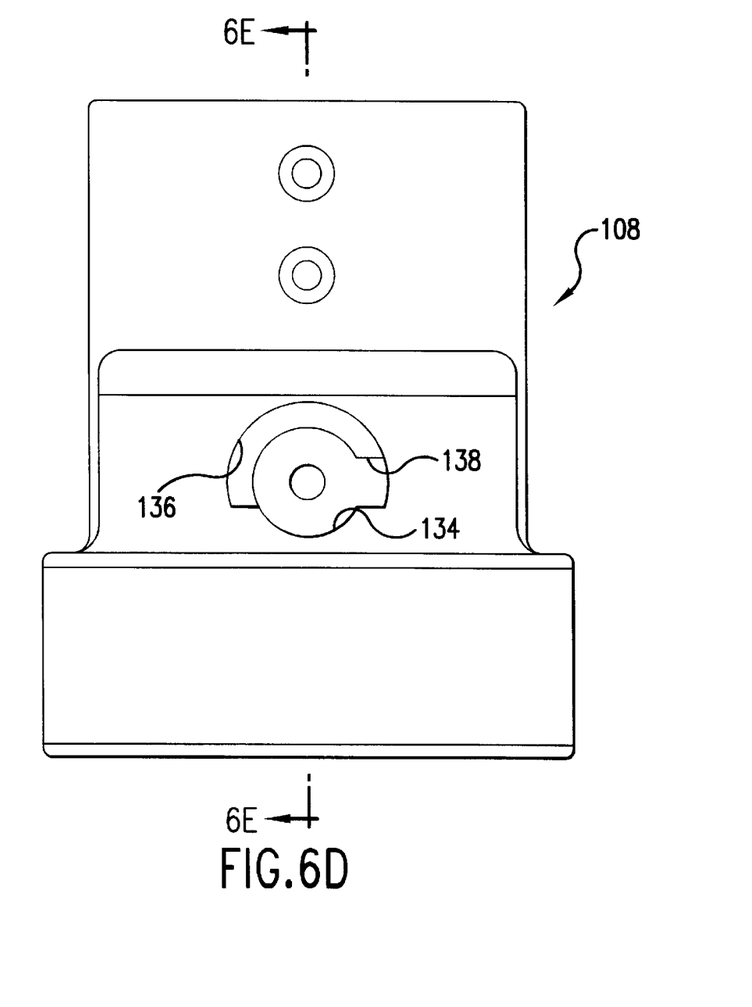
FIG. 6D is a bottom plan view of a top flange of a crossbar's clamping member from the roof rack system of FIG. 1.
Figure 6E:
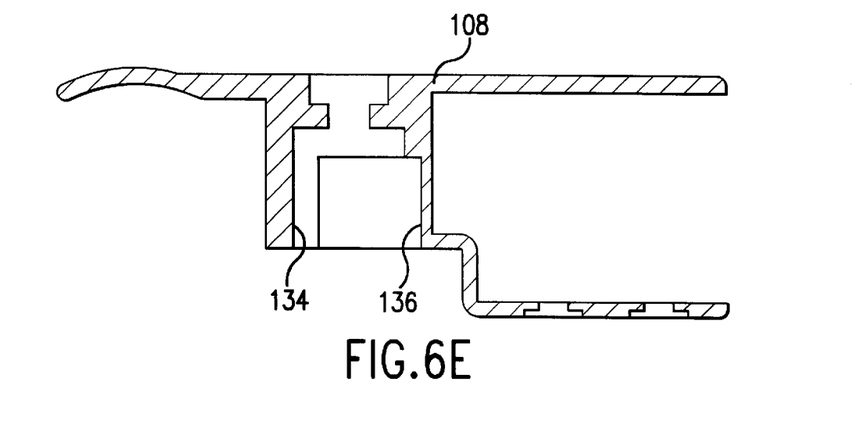
FIG. 6E is a cross-sectional view of the bottom flange of FIG. 6D, taken along line 6E—6E of FIG. 6D.

With reference to FIG. 5, each clamping member 106 includes an upper flange 108 and a lower flange 110, the upper and lower flanges forming a preferably C-shaped mouth conforming to the periphery of the side-rails longitudinal portions 46. In particular, the upper flange extends over the upper side 44 of the side-rail's longitudinal portion, in a fashion similar to that of the flanges of the air deflector 16 and storage bin 18, while the lower flange extends under the side-rail's longitudinal portion, preferably in an approximately symmetric fashion. This arrangement forms the C-shaped mouth, so as to be configured to receive the side-rail's longitudinal portion. However, for ease of removal of the crossbar, it is preferable that the clamping mechanism's flanges not extend as far around the side-rails 12 or 14 as the flanges of the air deflector and the storage bin.

To provide for the clamping members 106 to clamp the side-rails 12 and 14, the upper and lower flanges 108 and 110 are movable relative to each other. In particular, the upper flange is preferably attached rigidly to the crossbar's longitudinal member 100 by a body portion 112, while the lower flange is unitary with a lever arm 114 and a fulcrum portion 116, with a connector such as a screw 118 extending through the lever arm to a nut 119, between the fulcrum portion and the lower flange, to pull the lever arm towards the body portion of the clamping member. This arrangement allows a downward load to be carried by a non-moving structure (the upper flange), while the screw does not carry that load. Preferably, the upper and lower flanges are lined with a compressible material having reasonable gripping ability, such as rubber, to aid in the grip of the clamping members on the side-rails.

With reference to FIG. 5 and FIGS. 6A–6E, the lower flange 110 includes a shaft 130 having a key 132. This keyed shaft is sized to be slidingly received in a conforming hole 134 defined in the upper flange 108, providing for sliding engagement as the lower flange is raised into place with respect to the upper flange in a suitable clamping relationship. The hole includes a larger diameter portion 136 that allows the shaft to rotate in the hole when the shaft is only partially inserted into the hole, as well as a key-slot 138 to prevent rotation when it is more completely inserted in the hole. Thus, the screw 118 can be loosened and the lower flange rotated to remove the clamping member 106 from a side-rail's longitudinal portion 46. This can be accomplished without completely loosening the screw and removing the lower flange. It should be understood that upper and lower flanges can be designed in various ways, such as with internal ribs for strength, without changing the nature of the invention.

Thus, with the simple tightening or loosening of a single screw on each side, the crossbars 20 and 22 can be attached, removed, or adjusted in longitudinal position along the side-rails 12 and 14. More particularly, when the storage bin is in place, the crossbars can be positioned between a mid portion of the side-rails and the rear end 42 of the side-rails. This simple and efficient mechanism has few hidden interior spaces to become clogged with mud, and can be quickly disassembled if it becomes necessary to replace a part such as the screw 118 or the lower flange 110 and lever arm 114.

Most preferably, the crossbars' clamping members 106 are configured to receive the side-rails 12 and 14 such that the line A—A defined by each end 102 and 104 of the crossbar 20 or 22 intersects its respective side-rail, and forms a substantially planar upper surface 120 at the connection between the clamping member and the side-rail's longitudinal portion (see FIG. 1A). While it is to be understood that the crossbars might be curved, such as to conform to the shape of a vehicle roof, or that the crossbars could be formed of some type of compound structure (such as having two clamping members on one side and one on the other), the above description of the intersection is understood to refer to the line of the longitudinal member at its end, and not at some central point of the longitudinal member. Thus, the preferred embodiment provides a substantially planar upper surface at each clamping member, aiding in supporting an item resting on the side-rails and crossbars, rather than on the roof itself.

The leading air deflector 16, spaced in front of the step to form a forward cargo basin, provides for a vehicle's driver to take maximum advantage of the aerodynamics of the air deflector while carrying cargo in the cargo basin. Adding the cargo bin within the cargo basin provides an enclosed space that carries cargo above the surface of the roof. Furthermore, following the leading air deflector and low profile storage bin with the portion of the roof rack that includes the adjustable crossbars 20, 22, provides for a vehicle's driver to take maximum advantage of the aerodynamics of the air deflector. In particular, depending on the aerodynamic drag and noise experienced by the driver, the driver can experimentally find regions of minimum aerodynamic disturbance for a given item on the roof, and for particular driving conditions. Also, a driver may find that, for particular driving conditions during inclement whether, an item can be adjusted to a particular longitudinal location to, provide maximum protection from the weather.

From the foregoing description, it will be appreciated that the present invention provides a roof rack system offering simplicity of manufacture, use and maintenance, while providing for aerodynamically and structurally efficient support for a wide variety of items to be carried on the roof of a vehicle.

While a particular form of the invention has been illustrated and described, it will be apparent that various modifications can be made without departing from the spirit and scope of the invention. Thus, although the invention has been described in detail with reference only to the preferred embodiments, those having. ordinary skill in the art will appreciate that various modifications can be made without departing from the invention. Accordingly, the invention is not intended to be limited, and is defined with reference to the following claims.

We claim:

1. A vehicle roof rack system for carrying items on top of a vehicle's roof, comprising:
   a left side-rail and a right side-rail, each side-rail including a longitudinal portion;
   at least one crossbar extending between the longitudinal portions of the left side-rail and the right side-rail;
   a storage bin extending between the left side-rail and the right side-rail, the storage bin including a basket portion attached to the longitudinal portions such that the basket portion is carried above the vehicle's roof without contacting the vehicle's roof; and
   an air deflector forward of the storage bin, the air deflector being configured to direct air over the storage bin, wherein the air deflector extends upward to a level below the top of the side-rails.

2. The vehicle roof rack system of claim 1, wherein each side-rail includes at least three stanchions, one of the at least three stanchions being located substantially at a front end of the storage bin, and one of the at least three stanchions being located substantially at a rear end of the storage bin.

3. The vehicle roof rack system of claim 1, wherein each of the longitudinal portions is configured to extend in a fore-and-aft direction along the vehicle.

4. The vehicle roof rack system of claim 1, wherein the storage bin extends upward to a level below the top of the side-rails.

5. A vehicle roof rack system configured to be disposed on a vehicle having a first roof portion, a second roof portion, and a step therebetween, the first roof portion being at a lower height than the second roof portion, the first roof portion being in front of the second roof portion, the roof rack system comprising:

a left side-rail including a left front stanchion connectable to the first roof portion at a left side of the first roof portion and a left rear stanchion connectable to the second roof portion at a left side of the second roof portion, wherein the left side-rail is configured such that it can be disposed on the vehicle while accommodating the change in height between the first roof portion and the second roof portion;

a right side-rail including a right front stanchion connectable to the first roof portion at a right side of the first roof portion and a right rear stanchion connectable to the second roof portion at a right side of the second roof portion, wherein the right side-rail is configured such that it can be disposed on the vehicle while accommodating the change in height between the first roof portion and the second roof portion; and an air deflector located between the left side-rail and the right side-rail, wherein the air deflector is configured such that it can be disposed in front of and spaced from the step.

6. A roof rack system as set forth in claim 5, wherein a deflector panel of the air deflector is configured to be disposed substantially co-planar with a windshield of the vehicle.

7. A roof rack system as set forth in claim 5, wherein the left and right side-rails are tubular in shape.

8. A roof rack system as set forth in claim 5, further comprising at least one crossbar.

9. A roof rack system as set forth in claim 5, wherein the air deflector extends upward to a level below the top of the side-rails.

10. The vehicle roof rack system of claim 5, wherein the left and right front stanchions are longer than the left and right rear stanchions, respectively, to permit the left and right side-rails to be disposed on the vehicle while accommodating the change in height between the first roof portion and the second roof portion.

11. The vehicle roof rack system of claim 10, wherein the left and right front stanchions are longer than the left and right rear stanchions, respectively, to permit the left and right side-rails to be disposed on the vehicle while accommodating the change in height between the first roof portion and the second roof portion.

12. The vehicle roof rack system of claim 5, further comprising a storage bin, wherein the vehicle roof rack system is configured such that at least a portion of the storage bin can be located between the air deflector and the step.

13. A roof rack system as set forth in claim 12, wherein the air deflector is configured to deflect rearward-flowing air upward to pass over the storage bin.

14. A roof rack system as set forth in claim 12, wherein the storage bin is immediately behind the air deflector.

15. A roof rack system as set forth in claim 12, wherein the storage bin extends upward to a level below the top of the side-rails.

16. A vehicle roof rack system for extending above a vehicle's roof, comprising:

a left side-rail and a right side-rail defining a space therebetween, each side-rail including a longitudinal portion;

a storage bin extending into the space between the left side-rail and the right side-rail, and extending between the front ends of the side-rails and mid-portions of the side-rails; and an air deflector extending into the space between the left side-rail and the right side-rail, extending between the front ends of the left and right side-rails, and being configured to deflect rearward-flowing air upward to pass over the storage bin.

17. The vehicle roof rack system of claim 16, wherein each of the longitudinal portions is configured to extend in a fore-and-aft direction along the vehicle.

18. The vehicle roof rack system of claim 16, the storage bin including a left flange, a right flange, and a basket portion, the left and right flanges being configured to attach to the left and right side-rails, respectively, to carry the basket portion above the vehicle's roof without the basket portion contacting the vehicle's roof, wherein the basket portion extends upward to a level below the top of the side-rails.

19. The vehicle roof rack system of claim 16, wherein each side-rail includes at least three stanchions, one of the at least three stanchions being located substantially at a front end of the storage bin, and one of the at least three stanchions being located substantially at a rear end of the storage bin.

20. The vehicle roof rack system of claim 16, further comprising at least one crossbar extending between the longitudinal portions at a location rearward of the mid-portions of the side-rails.

21. The vehicle roof rack system of claim 20, wherein the crossbar is adjustably positionable between the mid-portions and the rear ends of the side-rails.

22. A vehicle roof rack system configured to be disposed on a vehicle having a first roof portion, a second roof portion, and a step therebetween, the first roof portion being at a lower height than the second roof portion, the first roof portion being in front of the second roof portion, the roof rack system comprising:

a left side-rail including a left front stanchion connectable to the first roof portion at a left side of the first roof portion and a left rear stanchion connectable to the second roof portion at a left side of the second roof portion, wherein the left side-rail is configured such that it can be disposed on the vehicle while accommodating the change in height between the first roof portion and the second roof portion;

a right side-rail including a right front stanchion connectable to the first roof portion at a right side of the first roof portion and a right rear stanchion connectable to the second roof portion at a right side of the second roof portion, wherein the right side-rail is configured such that it can be disposed on the vehicle while accommodating the change in height between the first roof portion and the second roof portion; and a storage bin, at least a portion of the storage bin being located between the left side-rail and the right side-rail and the storage bin being configured such that the portion can be disposed in front of the step.

23. A roof rack system as set forth in claim 22, further comprising at least one crossbar.

24. A roof rack system as set forth in claim 22, wherein the storage bin extends upward to a level below the top of the side-rails.

25. A vehicle roof rack system for extending above a vehicle's roof, comprising:
- a left side-rail and a right side-rail, each side-rail including a longitudinal portion; and
- a storage bin extending between the left side-rail and the right side-rail, the storage bin including a basket portion attached to the side-rails such that the basket portion is carried above the vehicle's roof without contacting the vehicle's roof, wherein the storage bin extends upward to a level below the top of the side-rails.

26. The vehicle roof rack system of claim 25, wherein each of the longitudinal portions is configured to extend in a fore-and-aft direction along the vehicle.

27. A vehicle roof rack system, comprising:
- a left side-rail and a right side-rail, each side-rail including a longitudinal portion that is tubular in shape; and
- stanchions at opposite ends of each of the left and right side-rails,
- wherein substantially all of the left side-rail, the right side-rail, and the stanchions have an outside shape that in cross-section is substantially constant, the same, and circular.

28. The vehicle roof rack system of claim 27, wherein each of the longitudinal portions is configured to extend in a fore-and-aft direction along the vehicle.

29. A vehicle roof rack system configured to be disposed on a vehicle having a first roof portion, a second roof portion, and a step therebetween, the first roof portion being at a lower height than the second roof portion, the first roof portion being in front of the second roof portion, the roof rack system comprising:
- a left side-rail connectable to the first roof portion at a left side of the first roof portion and connectable to the second roof portion at a left side of the second roof portion; and
- a right side-rail connectable to the first roof portion at a right side of the first roof portion and connectable to the second roof portion at a right side of the second roof portion,
- wherein the left side-rail and the right side-rail each extend substantially horizontally substantially throughout their lengths.

30. A vehicle comprising:
- a first roof portion;
- a second roof portion;
- a step between the first and second roof portions, the first roof portion being at a lower height than the second roof portion, the first roof portion being in front of the second roof portion; and
- a roof rack system comprising:
  - a left side-rail connectable to the first roof portion at a left side of the first roof portion and connectable to the second roof portion at a left side of the second roof portion;
  - a right side-rail connectable to the first roof portion at a right side of the first roof portion and connectable to the second roof portion at a right side of the second roof portion; and
  - an air deflector located in front of the step and between the left side-rail and the right side-rail, wherein the air deflector is spaced from the step.

31. The vehicle of claim 30, wherein a deflector panel of the air deflector is disposed substantially co-planar with a windshield of the vehicle.

32. The vehicle of claim 30, wherein the air deflector extends upward to a level below the top of the side-rails.

33. The vehicle of claim 30, further comprising a storage bin, wherein at least a portion of the storage bin is located between the air deflector and the step.

34. The vehicle of claim 33, wherein the storage bin extends upward to a level below the top of the side-rails.

35. The vehicle of claim 33, wherein the storage bin is immediately behind the air deflector.

36. A vehicle comprising:
- a first roof portion;
- a second roof portion;
- a step between the first and second roof portions, the first roof portion being at a lower height than the second roof portion, the first roof portion being in front of the second roof portion; and
- a roof rack system comprising:
  - a left side-rail connectable to the first roof portion at a left side of the first roof portion and connectable to the second roof portion at a left side of the second roof portion;
  - a right side-rail connectable to the first roof portion at a right side of the first roof portion and connectable to the second roof portion at a right side of the second roof portion; and
  - a storage bin, at least a portion of the storage bin being located between the left side-rail and the right side-rail and in front of the step.

37. The vehicle of claim 36, wherein the storage bin extends upward to a level below the top of the side-rails.

38. A vehicle roof rack system for extending above a vehicle's roof, comprising:
- a left side-rail and a right side-rail, each side-rail including a longitudinal portion; and
- an air deflector disposed at a front of the vehicle roof rack system and being configured to direct air over the vehicle's roof, wherein the air deflector extends upward to a level below the top of the side-rails,
- wherein a deflector panel of the air deflector is configured to be disposed substantially co-planar with a windshield of the vehicle.

39. A vehicle roof rack system for extending above a vehicle's roof, comprising:
- a left side-rail and a right side-rail, each side-rail including a longitudinal portion; and
- an air deflector disposed at a front of the vehicle roof rack system and being configured to direct air over the vehicle's roof, wherein the air deflector extends upward to a level below the top of the side-rails,
- wherein each of the longitudinal portions is configured to extend in a fore-and-aft direction along the vehicle.

* * * * *